(12) United States Patent
Sasaki

(10) Patent No.: US 11,239,679 B2
(45) Date of Patent: Feb. 1, 2022

(54) BATTERY PACK WITH CHARGING CONTROL

(71) Applicant: Envision AESC Energy Devices Ltd., Sagamihara (JP)

(72) Inventor: Hiroshi Sasaki, Sagamihara (JP)

(73) Assignee: Envision AESC Japan Ltd., Sagamihara (JP)

( * ) Notice: Subject to any disclaimer, the term of this patent is extended or adjusted under 35 U.S.C. 154(b) by 93 days.

(21) Appl. No.: 16/631,679

(22) PCT Filed: Jun. 27, 2018

(86) PCT No.: PCT/JP2018/024317
§ 371 (c)(1),
(2) Date: Jan. 16, 2020

(87) PCT Pub. No.: WO2019/021728
PCT Pub. Date: Jan. 31, 2019

(65) Prior Publication Data
US 2020/0169106 A1 May 28, 2020

(30) Foreign Application Priority Data
Jul. 27, 2017 (JP) .............................. JP2017-145184

(51) Int. Cl.
*H01M 10/46* (2006.01)
*H02J 7/00* (2006.01)
*H01M 10/48* (2006.01)

(52) U.S. Cl.
CPC ......... *H02J 7/00714* (2020.01); *H01M 10/46* (2013.01); *H01M 10/486* (2013.01); *H02J 7/0047* (2013.01); *H02J 7/007192* (2020.01)

(58) Field of Classification Search
CPC .... H02J 7/0068; H02J 7/00714; H02J 7/0047; H02J 7/007192; H01M 10/486; H01M 10/46; H01M 10/48
(Continued)

(56) References Cited

U.S. PATENT DOCUMENTS 5,115,371 A 5/1992 Tripodi
5,680,027 A 10/1997 Hiratsuka et al.
(Continued)

FOREIGN PATENT DOCUMENTS

EP 3 038 226 A1 6/2016
JP 3-105817 A 5/1991
(Continued)

OTHER PUBLICATIONS

Translation of WO 2013065588 (May 10, 2013) (Year: 2013).*
International Search Report for PCT/JP2018/024317 dated Jul. 31, 2018 [PCT/ISA/210].

*Primary Examiner* — Edward Tso
(74) *Attorney, Agent, or Firm* — Sughrue Mion, PLLC

(57) ABSTRACT

A battery pack (2000) includes a battery (2020), a contact-type switch (2040), a control unit (2060), and a sensor (2080). The battery pack (2000) is connected to a charger (10) through an electric power line (30). The battery (2020) is charged with a charging current supplied from the charger (10). The battery pack (2000) is connected to a load (20) through an electric power line (40). The contact-type switch (2040) is provided between the charger (10) and the battery (2020). The control unit (2060) turns off the contact-type switch (2040) in a case where a value detected by the sensor (2080) is equal to or smaller than a reference value decided based on specifications of the contact-type switch (2040).

4 Claims, 5 Drawing Sheets

(58) Field of Classification Search
USPC ....... 320/107, 112, 132, 134, 136, 150, 162, 320/164
See application file for complete search history.

(56) References Cited

U.S. PATENT DOCUMENTS

2008/0297116 A1* 12/2008 Odaohhara ........... H01M 10/48
320/137
2016/0261127 A1* 9/2016 Worry ................. H01M 10/425

FOREIGN PATENT DOCUMENTS

| | | |
|---|---|---|
| JP | 2005-312195 A | 11/2005 |
| WO | 94/10718 A1 | 5/1994 |
| WO | 2013/065588 A1 | 5/2013 |

* cited by examiner

BATTERY PACK WITH CHARGING CONTROL

CROSS REFERENCE TO RELATED APPLICATIONS

This application is a National Stage of International Application No. PCT/JP2018/024317 filed Jun. 27, 2018, claiming priority based on Japanese Patent Application No. 2017-145184 filed Jul. 27, 2017, the disclosure of which is incorporated herein in its entirety by reference.

TECHNICAL FIELD

The present invention relates to charging of a secondary battery.

BACKGROUND ART

A technology, which is related to charging of a storage battery, has been developed to control the charging. Patent Document 1 discloses a technology for preventing power interruption from occurring by allowing a discharging current to flow through diodes during a period of mechanical delay time of a contact of a switch in a case where discharging of the storage battery starts from a state in which charging of the storage battery stops.

RELATED DOCUMENT

Patent Document

[Patent Document 1] Japanese Patent Application Publication No. 2005-312195

SUMMARY OF THE INVENTION

Technical Problem

A life of a contact-type switch includes an electrical life resulting from an electrical load (electric conduction), and a mechanical life resulting from a mechanical load (open and close of a switch, or the like). Generally, the mechanical life is longer than the electrical life, and the life of the contact-type switch is substantially limited to the electrical life. Patent Document 1 does not refer to the life of the contact type switch.

The present invention is made in view of the above problem, and has an object to provide a technology for increasing the life of the contact-type switch used to control charging of a storage battery.

Solution to Problem

According to the present invention, there is provided a battery pack including 1) a battery that is connected to a load and a charger, 2) a contact-type switch that is provided between the battery and the charger, 3) a control unit that controls the switch, and 4) a sensor that measures current which flows in the battery or a temperature around the switch. The battery, the charger, and the load are connected in parallel. The control unit turns off the switch in a case where a value detected by the sensor is equal to or smaller than a reference value decided based on specifications of the switch.

Advantageous Effects of Invention

According to the present invention, there is provided a technology for increasing a life of a contact-type switch used to control charging of a storage battery.

BRIEF DESCRIPTION OF THE DRAWINGS

The above-described object, another object, features, and advantages are further apparent with a preferable example embodiment which will be described below, and drawings which are accompanying with the example embodiment.

DESCRIPTION OF EMBODIMENTS

Hereinafter, an example embodiment of the present invention will be described with reference to the accompanying drawings. Also, the same reference symbols are attached to the same components throughout all the drawings, and the description thereof will not be repeated. In addition, unless being particularly described, respective blocks in a block diagram indicate components in functional units other than components in hardware units.

First Example Embodiment

Figure 1:
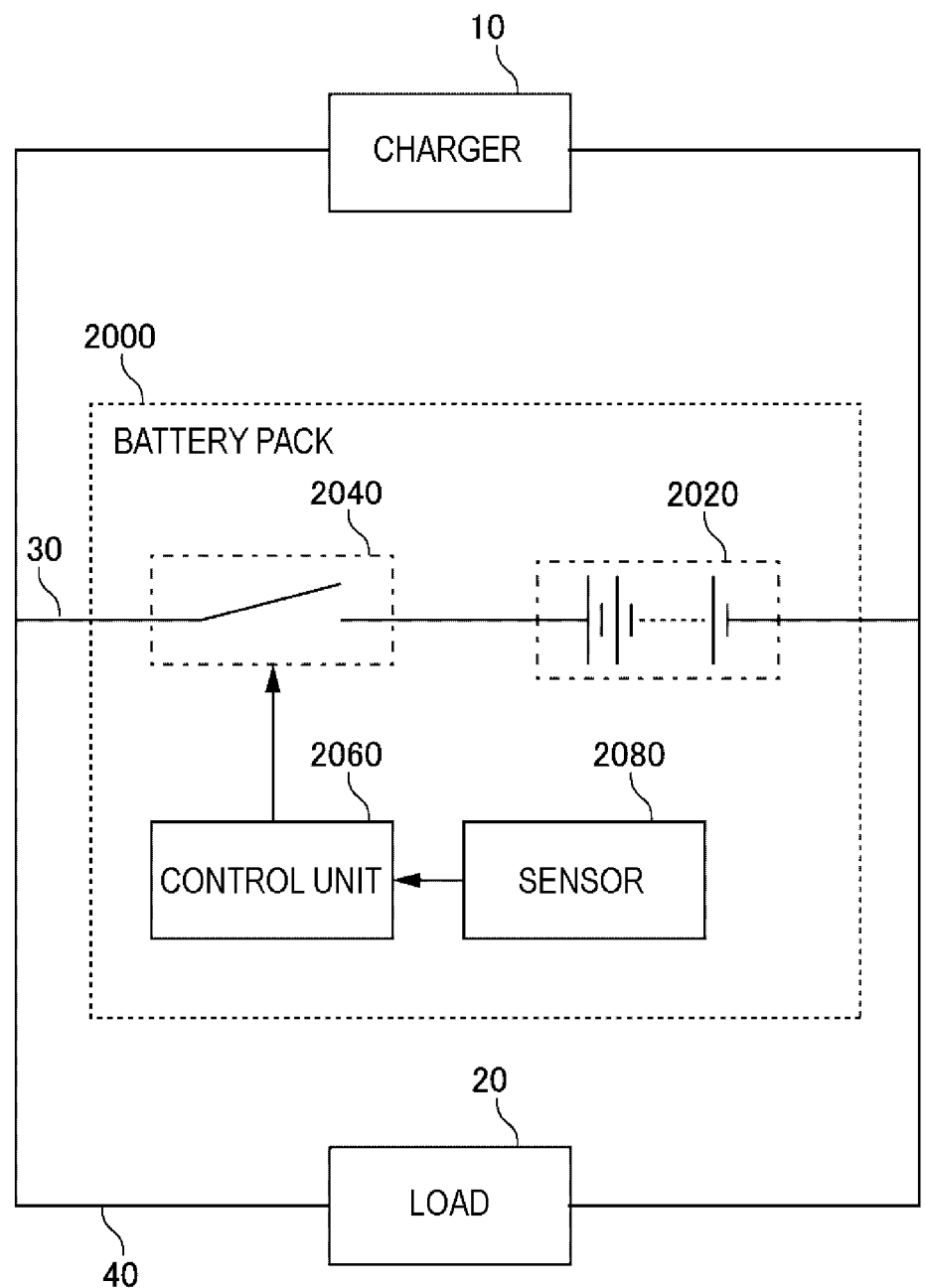
FIG. 1 is a diagram illustrating a battery pack of a first example embodiment, together with a usage environment thereof.

FIG. 1 is a diagram illustrating a battery pack 2000 of a first example embodiment, together with a usage environment thereof. The battery pack 2000 includes a battery 2020. The battery 2020 is a unit cell of any secondary battery (for example, a lithium-ion battery) or a group battery to which a plurality of unit cells of secondary batteries are connected. Hereinafter, the unit cell of the secondary battery is also referred to as a battery cell. The battery pack 2000 is connected to a charger 10 through an electric power line 30. The charger 10 is an apparatus which supplies a charging current. The battery 2020 is charged with the charging current supplied from the charger 10.

In addition, the battery pack 2000 is connected to a load 20 through an electric power line 40. The load 20 is any electrical equipment which is driven by electric power supplied from the battery pack 2000. For example, the load 20 is electrical equipment (for example, a server machine) which is installed in a facility such as a mobile terminal base station or a data center. As illustrated in FIG. 1, the charger 10, the battery 2020, and the electric power line 30 are connected in parallel, respectively.

The battery pack 2000 further includes a contact-type switch 2040, a control unit 2060, and a sensor 2080. The contact-type switch 2040 is a contact-type switch provided between the charger 10 and the battery 2020. The contact-type switch 2040 is, for example, an electromagnetic relay or the like.

The control unit 2060 controls the contact-type switch 2040 based on a result of measurement performed by the sensor 2080. The sensor 2080 is a current sensor that measures current which flows in the battery 2020 or a temperature sensor that measures a temperature around the contact-type switch 2040. In a case where a value detected by the sensor 2080 is equal to or smaller than a reference value decided based on specifications of the contact-type switch 2040, the control unit 2060 turns off the contact-type switch 2040. Here, "turn off the contact-type switch 2040" means that a state of the contact-type switch 2040 is changed to a state in which the current does not flow through the contact-type switch 2040. It is possible to reword "turn off the contact-type switch 2040" to "open the contact-type switch 2040". In contrast, a fact that the state of the contact-type switch 2040 is changed to a state in which the current flows through the contact-type switch 2040 is described as "turn on the contact-type switch 2040" or "close the contact-type switch 2040".

Advantageous Effects

In a case where the contact-type switch 2040 is turned off immediately after charging of the battery 2020 is completed, the contact-type switch 2040 is opened while a large charging current flows in the contact-type switch 2040, and thus a large electrical load is applied to the contact-type switch 2040. Therefore, in a case where the contact-type switch 2040 is turned off, the contact-type switch 2040 is deteriorated, and thus a life of the contact-type switch 2040 is reduced.

Here, in the battery pack 2000 of the example embodiment, the contact-type switch 2040 is turned off in a case where the value detected by the sensor 2080 is equal to or smaller than the reference value decided based on the specifications of the contact-type switch 2040. In this manner, the electrical load which is applied to the contact-type switch 2040 is small in a case where the contact-type switch 2040 is turned off. Accordingly, the deterioration of the contact-type switch 2040 caused by turning off the contact-type switch 2040 is reduced, and thus the life of the contact-type switch 2040 increases.

Note that, one purpose of installing the contact-type switch 2040 is to avoid float charging. There is a secondary battery whose characteristics are deteriorated due to the float charging. In a charging circuit of the secondary battery which is not suitable for the float charging as above, a switch is introduced, and thus the float charging is not performed. The battery pack 2000 of the example embodiment is specifically preferable in a case where the secondary battery, which is not suitable for the float charging, is used as the battery 2020. In a case where the contact-type switch 2040 is appropriately controlled, a characteristic deterioration of the battery 2020 is prevented in such a way that the float charging is not performed on the battery 2020, and thus the life of the contact-type switch 2040 increases.

<Outline of Hardware Configuration>

The control unit 2060 may be realized by only hardware (for example: a hard-wired electronic circuit or the like), or may be realized through a combination of the hardware and software (for example: a combination of an electronic circuit and a program which controls the electronic circuit, or the like). Hereinafter, a case where the control unit 2060 is realized through the combination of the hardware and the software will be further described.

Figure 2:
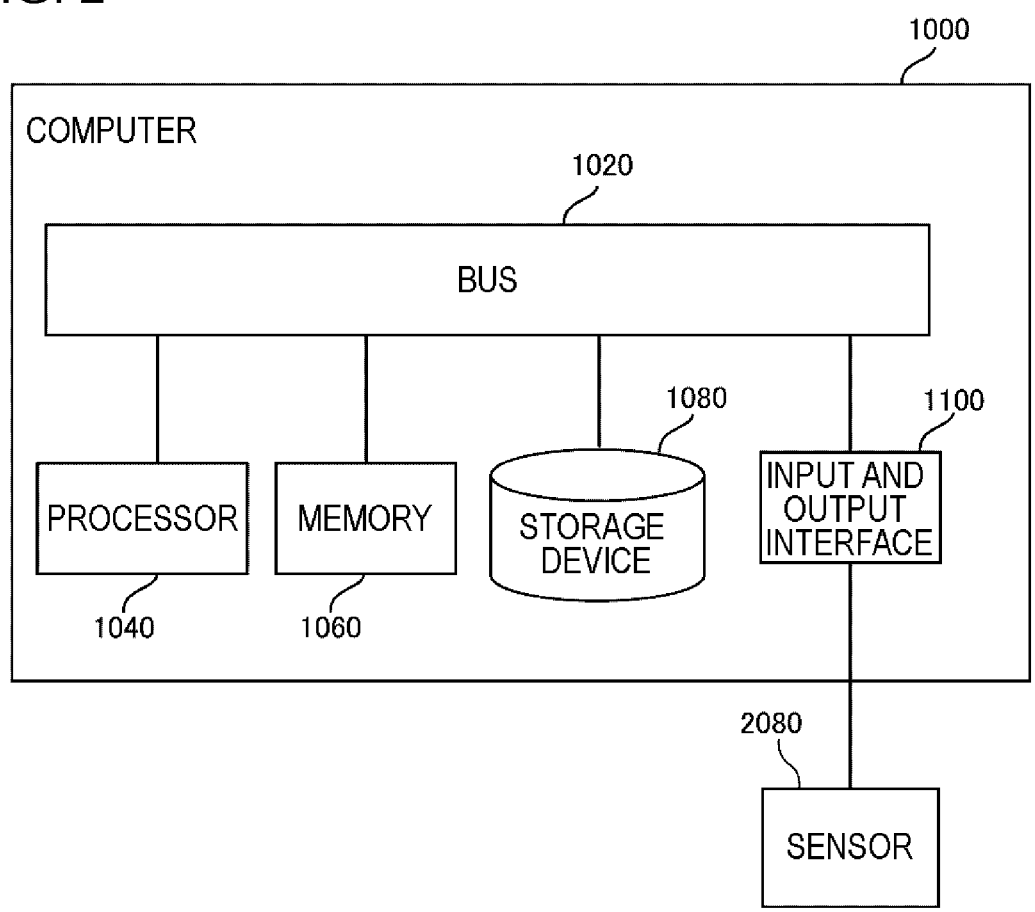
FIG. 2 is a diagram illustrating a computer for realizing a control unit.

FIG. 2 is a diagram illustrating a computer 1000 for realizing the control unit 2060. For example, the computer 1000 is an integrated circuit such as a System on Chip (SoC). The computer 1000 may be a dedicated computer designed to realize the control unit 2060, or a general-purpose computer.

The computer 1000 includes a bus 1020, a processor 1040, a memory 1060, a storage device 1080, and an input and output interface 1100. The bus 1020 is a data transmission path for transmitting and receiving data by the processor 1040, the memory 1060, the storage device 1080, and the input and output interface 1100 with each other. However, a method for connecting the processor 1040 and the like to each other is not limited to bus connection. The processor 1040 is a processor such as a Microprocessor (MPU). The memory 1060 is a main storage apparatus which is realized using a Random Access Memory (RAM) or the like. The storage device 1080 is an auxiliary storage apparatus realized using a Read Only Memory (ROM), a flash memory, or the like.

The input and output interface 1100 is an interface for connecting the computer 1000 to another device. For example, the computer 1000 is connected to the sensor 2080 through the input and output interface 1100.

The storage device 1080 stores a program module for realizing a function of the control unit 2060. The processor 1040 realizes the function of the control unit 2060 by reading and executing the program module in the memory 1060.

<Flow of Process>

Figure 3:
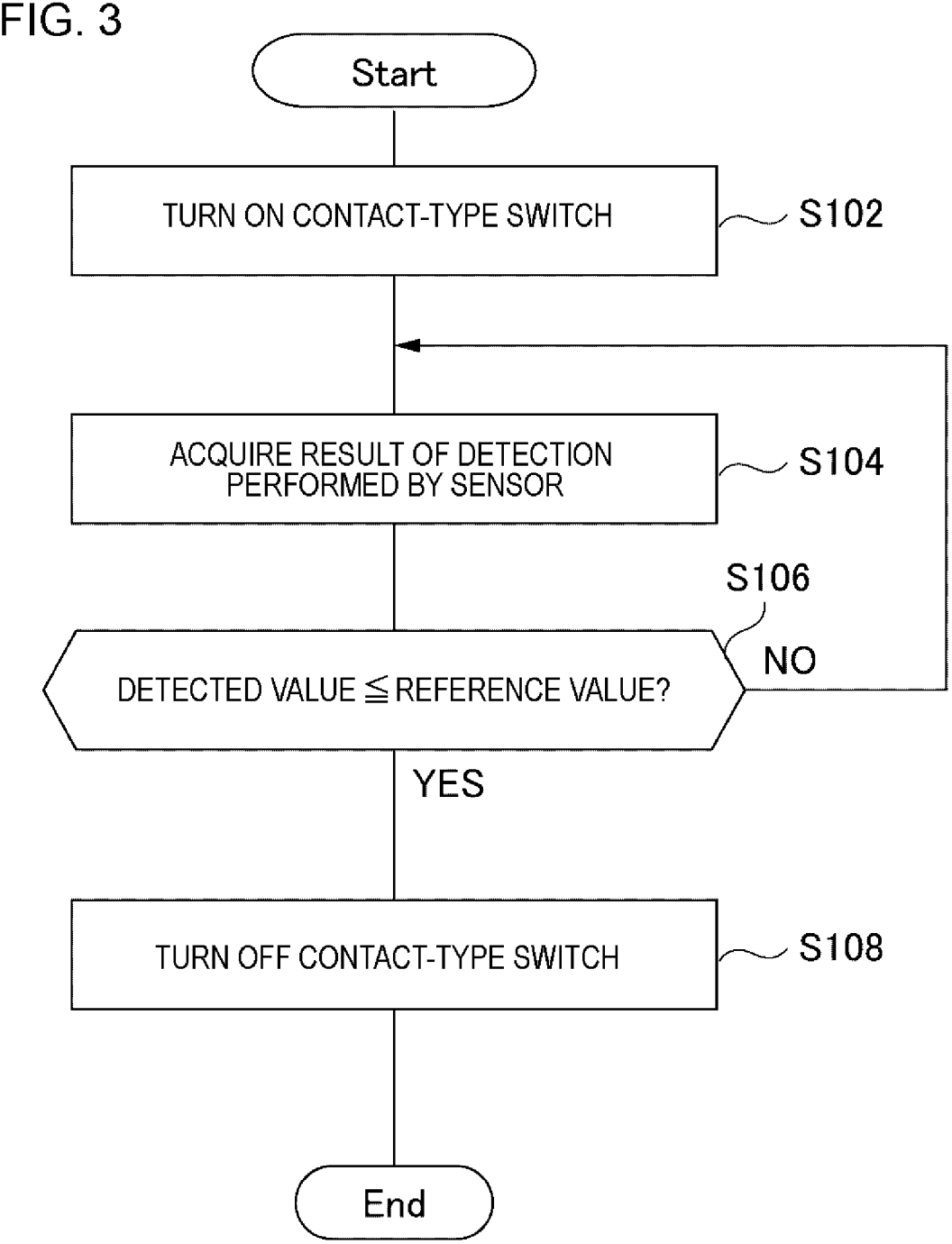
FIG. 3 is a flowchart illustrating a flow of a process performed by the control unit.

FIG. 3 is a flowchart illustrating an example of a flow of a process performed by the control unit 2060. The control unit 2060 turns on the contact-type switch 2040 (S102). Therefore, the charging of the battery 2020 starts. However, in a case where the charger 10 is connected to the battery pack 2000 and the contact-type switch 2040 is already turned on, it is not necessary that the control unit 2060 turns on the contact-type switch 2040.

The control unit 2060 acquires a result of measurement performed by the sensor 2080 (S104). The control unit 2060 determines whether or not a value detected by the sensor 2080 is equal to or smaller than the reference value (S106). In a case where the value detected by the sensor 2080 is not equal to or smaller than the reference value (S106: NO), the process of FIG. 3 proceeds to S104. In a case where the value detected by the sensor 2080 is equal to or smaller than the reference value (S106: YES), the control unit 2060 turns off the contact-type switch 2040 (S108).

According to the above-described flow, S104 and S106 are repeatedly performed until the value detected by the sensor 2080 is equal to or smaller than the reference value. The processes are performed, for example, at a predetermined frequency (once a second, or the like).

<Details of Control Performed by Control Unit 2060>

Figure 4:
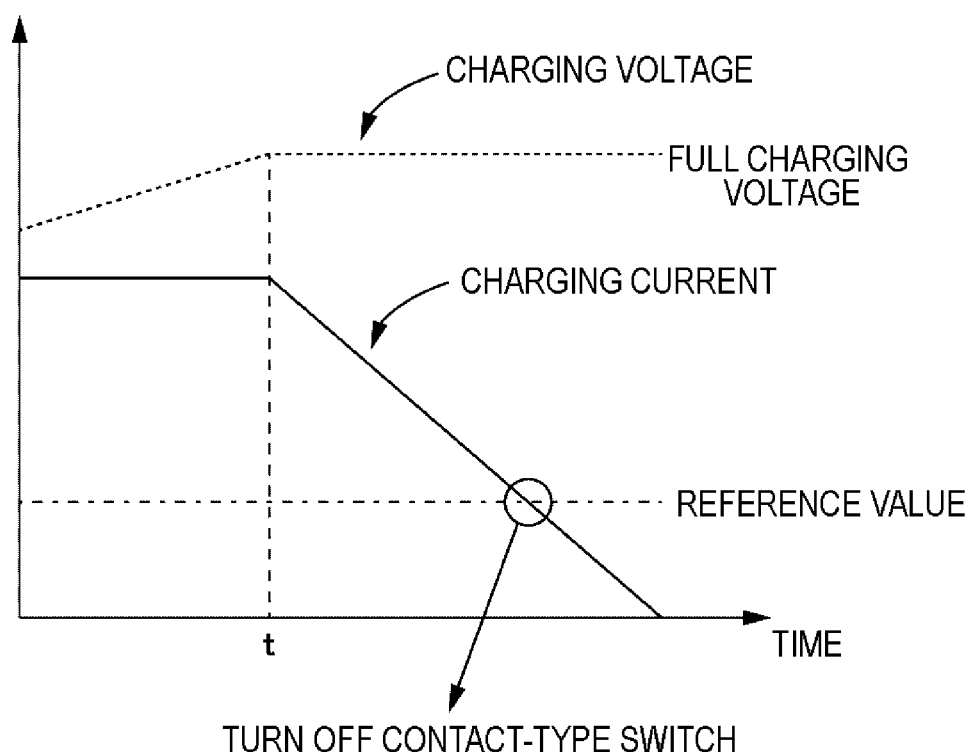
FIG. 4 is a graph illustrating a time change in a charging voltage of a battery and a size of a charging current output from a charger.

As described above, in a case where the value detected by the sensor 2080 is equal to or smaller than the reference value decided based on the specifications of the contact-type switch 2040, the control unit 2060 turns off the contact-type switch 2040. FIG. 4 is a graph illustrating a time change in a charging voltage of the battery 2020 and a size of the charging current output from the charger 10. In FIG. 4, a solid line indicates the charging current of the battery 2020, and a dotted line indicates the size of the charging voltage which is output from the charger 10.

At a time point t, the charging voltage of the battery 2020 reaches a full charging voltage. That is, the charging of the battery 2020 is completed at the time point t. As a result, after the time point t, the size of the charging current, which is output from the charger 10, is reduced.

The control unit 2060 detects that the size of the charging current, which is reduced as above, is equal to or smaller than the reference value, and turns off the contact-type switch 2040 according to the detection.

Here, the sensor 2080 is 1) the current sensor which measures the current which flows in the battery 2020, or 2) the temperature sensor which measures the temperature around the contact-type switch 2040. Hereinafter, in a case where the sensor 2080 is the current sensor and in a case where the sensor 2080 is the temperature sensor, control performed by the control unit 2060 will be described in detail, respectively.

<<Case where Sensor 2080 is Current Sensor>>

In the case where the sensor 2080 is the current sensor, the control unit 2060 turns off the contact-type switch 2040 in a case where a value of current detected by the sensor 2080 is equal to or smaller than a reference value of current decided based on the specifications of the contact-type switch 2040. Hereinafter, "the reference value of the current decided based on the specifications of the contact-type switch 2040" is referred to as a current reference value.

The current reference value is decided based on, for example, a rated current of the contact-type switch 2040. For example, it is preferable that the current reference value is a value which is equal to or smaller than 10% of the rated current of the contact-type switch 2040. In addition, it is preferable that the current reference value is a value which is equal to or larger than 1% of the rated current of the contact-type switch 2040.

<<Case where Sensor 2080 is Temperature Sensor>>

In the case where the sensor 2080 is the temperature sensor, the control unit 2060 turns off the contact-type switch 2040 in a case where the temperature detected by the sensor 2080 is equal to or smaller than the reference value decided based on the specifications of the contact-type switch 2040. For example, the reference value is decided based on a specification value of a contact resistance of the contact-type switch 2040.

<Supply of Electric Power to Load 20>

In a configuration of FIG. 1, it is necessary to turn on the contact-type switch 2040 in order to supply the electric power from the battery pack 2000 to the load 20. Therefore, for example, after the contact-type switch 2040 is turned off after the charging of the battery pack 2000 is completed, the contact-type switch 2040 is turned on at a timing at which the load 20 is operated.

Figure 5:
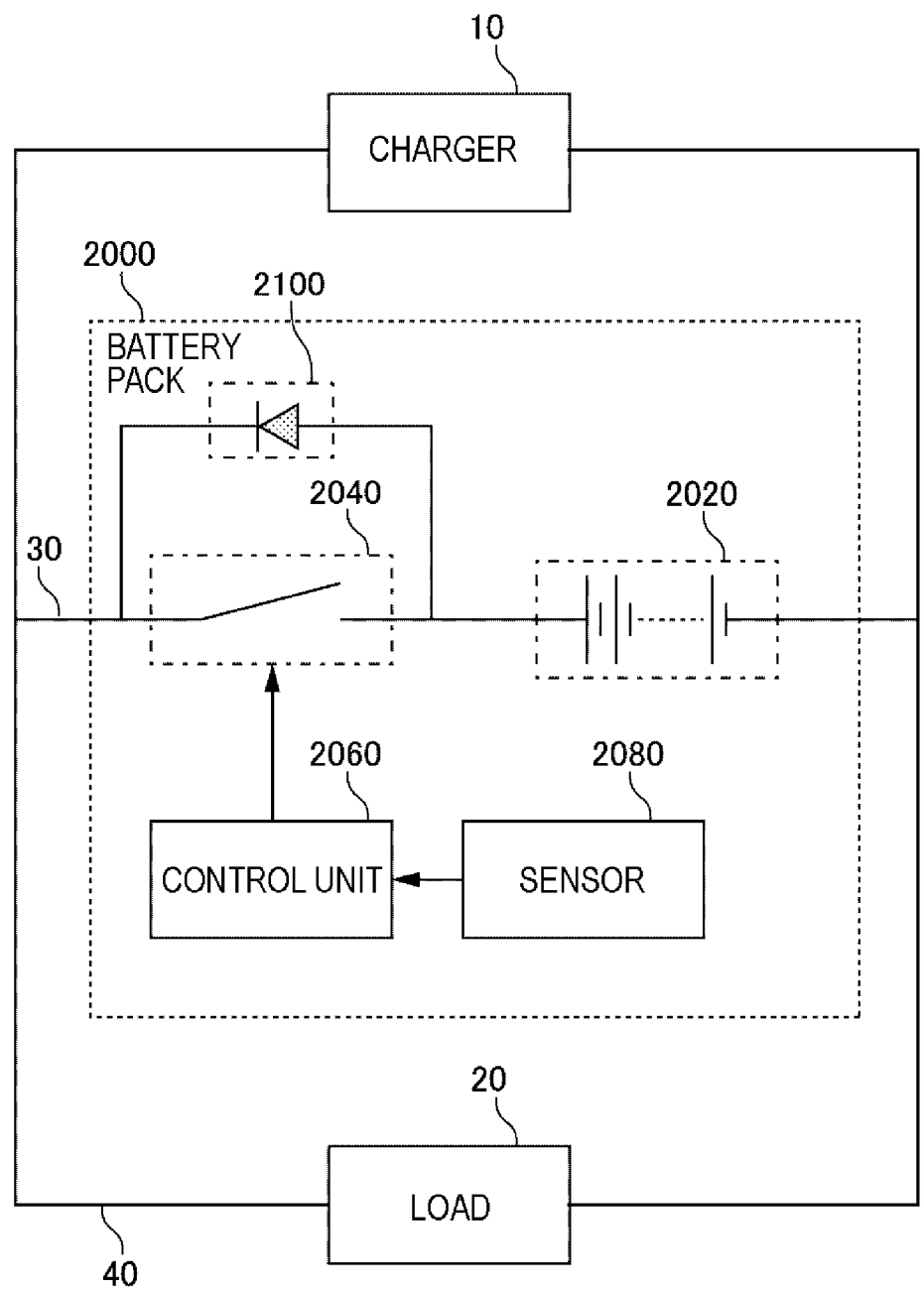
FIG. 5 is a diagram illustrating the battery pack which includes a rectifier element.

Here, in a case where the contact-type switch 2040 is turned on at the timing at which the load 20 is operated, a time lag occurs from when the load 20 is going to be operated until the load 20 can be actually operated. In order to reduce the time lag, it is preferable that the battery pack 2000 is provided to be parallel with the battery 2020 and a rectifier element is provided. FIG. 5 is a diagram illustrating the battery pack 2000 which includes the rectifier element.

A rectifier element 2100 causes the current to pass only in a direction in which the battery 2020 is discharged. That is, the rectifier element 2100 is configured to cause the current to pass in a direction which faces the load 20 from the battery 2020 and cause the current to do not pass in a direction which faces the battery 2020 from the charger 10.

In a case where the rectifier element 2100 is provided in the battery pack 2000 as described above, it is possible to supply the electric power from the battery 2020 to the load 20 even while the contact-type switch 2040 is turned off. Therefore, in a case where the load 20 starts an operation while the contact-type switch 2040 is turned off, it is possible to reduce time until the load 20 starts to an operation.

Hereinabove, although the example embodiment of the present invention is described with reference to the drawings, the example embodiment is only an example of the present invention, and it is possible to use various configurations other than the above-described configuration.

The invention claimed is:

1. A battery pack comprising:
   a battery that is connected to a load and a charger;
   a contact-type switch that is provided between the battery and the charger;
   a control unit that controls the switch; and
   a sensor that measures current which flows in the battery,
   wherein the battery, the charger, and the load are connected in parallel, and
   wherein the control unit turns off the switch in a case where a value detected by the sensor becomes equal to or smaller than a rated current of the switch after completing charging of the battery.

2. The battery pack according to claim 1,
   wherein the control unit turns off the switch in a case where the value detected by the sensor becomes is equal to or smaller than 10% of the rated current of the switch after completing charging of the battery.

3. The battery pack according to claim 1,
   wherein the control unit turns off the switch in a case where the value detected by the sensor becomes equal to or larger than 1% of the rated current of the switch after completing charging of the battery.

4. The battery pack according to claim 1, further comprising:
   an element that is provided in parallel to the switch, and causes the current to flow only in a direction in which the battery is discharged.

* * * * *